UNITED STATES PATENT OFFICE.

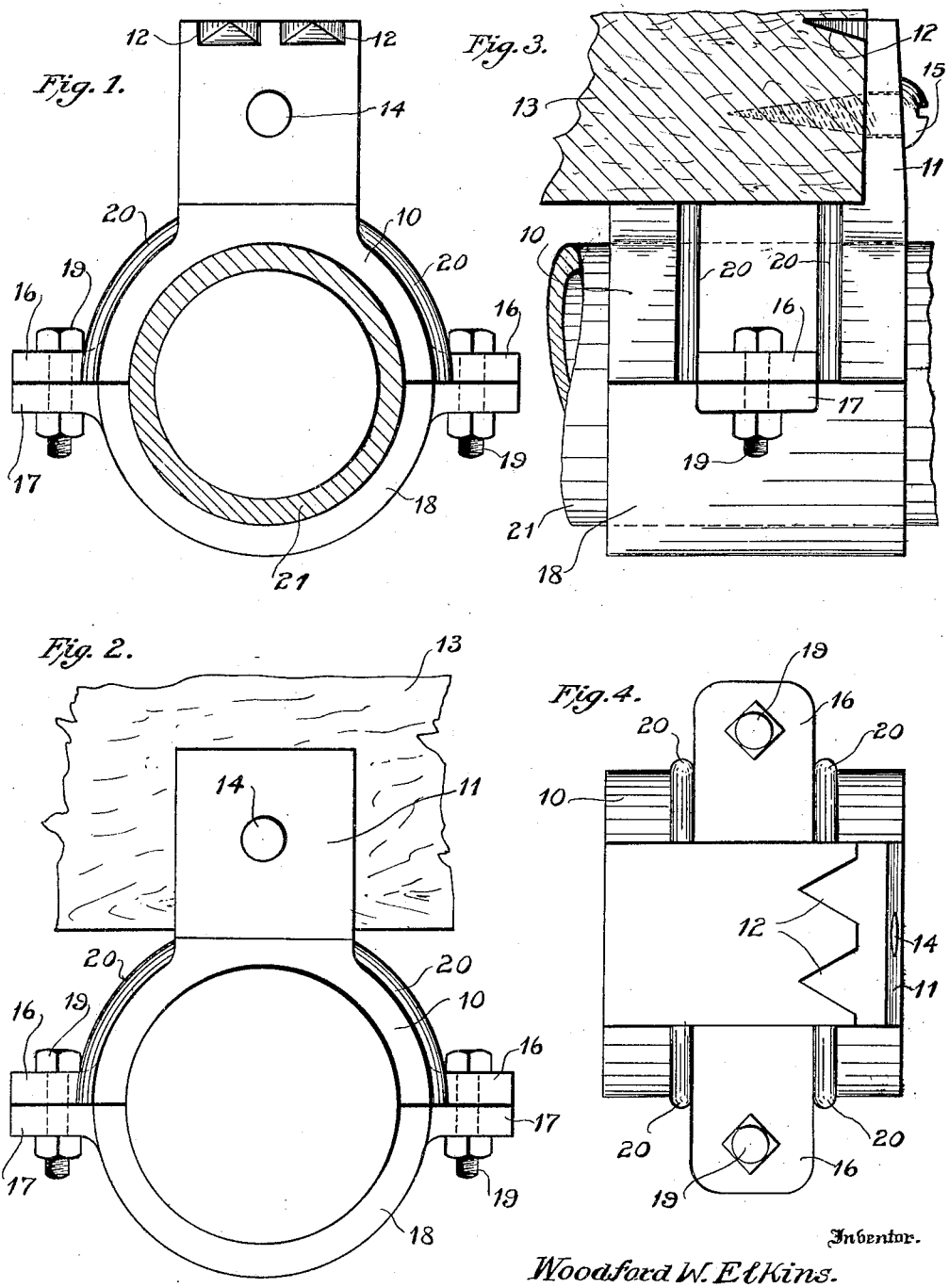

WOODFORD W. ELKINS, OF RENO, NEVADA.

PIPE-HANGER.

1,322,414.          Specification of Letters Patent.      Patented Nov. 18, 1919.

Application filed February 12, 1919. Serial No. 276,630.

*To all whom it may concern:*

Be it known that I, WOODFORD W. ELKINS, a citizen of the United States, residing at Reno, in the county of Washoe and State of Nevada, have invented certain new and useful Improvements in Pipe-Hangers; and I do hereby declare the following to be a full, clear, and exact description of the invention, such as will enable others skilled in the art to which it appertains to make and use the same.

This invention relates to pipe hangers and has for an object to provide a hanger especially adapted for hanging large or heavy pipes in various locations, as for instance, in mines or the like where the attachment of pipes to the timbering of the mines is sometimes difficult.

A further object of the invention is to provide a pipe hanger which can be quickly and easily applied and will maintain the pipe in position securely and permanently.

A further object of the invention is to provide a pipe hanger which can be applied with a minimum number of tools whereby the hanging of pipes by unskilled labor or the like is facilitated.

With these and other objects in view the invention comprises certain novel constructions, and combinations of parts which will be hereinafter more fully described and claimed.

In the drawing:

Figure 1 is a view of the improved pipe hanger in end elevation.

Fig. 2 is a view of the improved pipe hanger in end elevation seen from the end opposite that of Fig. 1.

Fig. 3 is a view of the improved pipe hanger in side elevation.

Fig. 4 is a view of the improved pipe hanger in plan seen from the point which will be called the top, although it is to be understood that the pipe hanger may be used in any relation to the article to which it is attached.

Like characters of reference indicate corresponding parts throughout the several views.

The improved pipe hanger which forms the subject matter of the present application comprises a segmental clamping member 10 having an ear 11 extending upwardly therefrom. The ear 11 is provided with prongs 12—12 adapted to be driven into the supporting article as timbers 13 and provided with an opening 14 through which any approved form of fastener as the screw 15 may be inserted.

The segment 10 is provided with ears 16 having openings registering with like openings in ears 17 in the complementary segment 18. Through the registering openings in the ears 16 and 17 fastening members as the bolt 19 may be inserted.

The segment 10 is preferably provided with strengthening ribs 20 and all so proportioned that after the segment 10 has been attached to the timber 13 the tightening of the bolt 19 will clamp the pipe 21 as indicated in Figs. 1 and 3.

In use the segment 10 will first be positioned relative to the supporting member by driving the prongs 12 into the timber and then inserting the screw 15 whereupon the pipe 21 will be placed in position in the curvature of said segment 10 and the segment 18 put in position with the bolts 19 inserted through the several members and tightened to clamp the pipe.

I claim:

A pipe hanger adapted for attachment to ceiling beams comprising a segment having a flat top adapted to engage the underside of the beam, an ear extending upwardly from said segment adapted to engage the side of the beam said ear terminating in prongs inturned over said flat surface and tapered on their under sides, an opening in said ear adapted to receive a fastening member, and a complementary segmental member adapted to be removably attached to said segment.

In testimony whereof I affix my signature.

WOODFORD W. ELKINS.